United States Patent Office 3,126,407
Patented Mar. 24, 1964

3,126,407
PROCESS FOR MAKING ALIPHATIC NITRILES
Delmer L. Cottle, Highland Park, and Leon S. Minckler, Jr., Metuchen, N.J., assignors to Esso Research and Engineering Company, a corporation of Delaware
No Drawing. Filed Dec. 30, 1960, Ser. No. 79,557
6 Claims. (Cl. 260—465.3)

The present invention relates to the manufacture of aliphatic nitriles from olefinic hydrocarbons. More specifically, it concerns the use of new catalysts comprising phosphates of copper for the synthesis of lower molecular weight unsaturated nitriles by reacting a monoolefin with ammonia in the presence of molecular oxygen.

Unsaturated aliphatic nitriles, especially acrylonitrile, are useful monomers in the production of synthetic polymers. Heretofore acrylonitrile has been synthesized from acetylene and hydrogen cyanide in the presence of a cuprous chloride catalyst, and from propylene and ammonia in the presence of various catalysts including copper oxide. The latter catalyst is not a particularly effective one in that it yields little acrylonitrile even under optimum temperature conditions.

It has now been found that phosphates of copper are highly suitable catalysts for preparing unsaturated lower molecular weight aliphatic nitriles from monoolefins, oxygen and ammonia. The copper catalyst is most effective on a carrier, such as silica, and therefore a supported catalyst is preferred. However, this does not mean that corresponding unsupported catalysts cannot be utilized in the process.

In carrying out the present invention a mole of a lower molecular weight monoolefin hydrocarbon, such as propylene, isobutylene and 2-butene, is admixed with about 0.1 to 5 moles of ammonia and about 0.3 to 5 moles of molecular oxygen, in the presence or absence of water or carbon dioxide, and passed through a reactor containing a fixed or fluid copper catalyst bed (the copper in said bed being mainly in the cupric form) that is at about 250 to 550° C. and under approximately atmospheric pressure, i.e. up to about 3 atmospheres. The contact time for the vapor phase reaction may vary from as little as 0.2 second up to about 10 or more seconds. Longer contact times, i.e. up to 15 seconds, can be used if desired. In terms of space velocity, the throughput should be about 250 to 2500 v./v./hr. The reaction products, which comprise principally the unsaturated aliphatic nitrile and some saturated cyanide such as acetonitrile, are recovered from the reactor effluent gases by conventional methods and any unreacted monoolefin is recycled to the reactor. The main reaction product is acrylonitrile and the principal by-product is acetonitrile. The latter usually represents about 7 to 16 weight percent of the combined acrylo- and acetonitriles in the effluent.

The catalyst, whether it contains a carrier or is unsupported, should be in the form of discrete particles that have sufficient surface area to provide good contact with the reactants. It can be finely divided or pelletized. The size of the particles will be course depend to a large extent on whether or not the bed is fluidized or fixed. If a fixed bed is used the catalyst is preferably about 10 to 20 mesh, although particle sizes of up to 4 mesh can be used with good results. In a fluidized system, the catalyst size is about 80 to 300 mesh. Steam or other known fluidizing agents that do not adversely affect the reaction can be used in accordance with well known techniques.

The preferred catalyst is cupric pyrophosphate. Other phosphate catalysts that can be used include cupric metaphosphate, cupric orthophosphate, cupric tripolyphosphate and cupric acid phosphate. These catalysts are especially effective when they are used on a silica carrier, such as silica hydrogel which contains 30 weight percent silica. Sometimes it is advantageous to add some phosphoric acid or metal oxide, e.g. nickel oxide, to improve the yield. If desired, the phosphoric acid can be periodically fed to the reactor to maintain catalyst selectivity.

The catalysts can be prepared by any conventional method. For instance, the copper salt can be mulled with silica gel and water for 10 to 20 hours, allowed to gel and dried. In some cases the dry catalyst is heated in a furnace for up to 16 hours at about 500° C. to remove any volatile material and crushed prior to use, while in other instances the dry catalyst is broken up, if necessary, and used without further treatment.

When a carrier is employed, it generally comprises the major proportion of the whole catalyst. In other words, the copper salt in the catalyst seldom exceeds 40 weight percent, and frequently is not more than 20 weight percent, based on the dry carrier. While small amounts of the copper salt, e.g. 1 weight percent, have some beneficial effect, it is usually necessary to use catalysts containing at least 5 weight percent, and preferably 10 to 20 weight percent, of the active copper compound, based on the carrier. The addition of about 1 to 15 weight percent of concentrated (86%) phosphoric acid, based on dry carrier, improves the yield of unsaturated aliphatic nitrile product in the case of less effective catalysts.

The olefin feed can be diluted with inert substances, such as paraffins. For instance when propylene is the olefin, the feed may consist of a mixture of propylene and propane, e.g. a propylene-rich $C_3$ stream that contains 30 to 50 weight percent propylene.

The ratio of the reactants affects the product distribution to some extent and therefore should be regulated accordingly. The optimum mole ratios in the synthesis of acrylonitrile are 0.1 to 1 mole of ammonia and 0.5 to 4 moles of oxygen per mole of propylene, and preferably 0.3 to 0.7 mole of ammonia and 1.0 to 2.5 moles of oxygen per mole of monoolefin in the feed. As can be seen from the foregoing ratios, it is best to use excess olefin in the reaction.

The most economical source of molecular oxygen is, of course, air. Other oxygen-containing gases can be advantageously used in the process.

The reaction conditions are not particularly critical. In general, the reaction should be effected at moderately high temperatures and substantially atmospheric pressure. The preferred reaction temperatures are between 350 and 450° C.

If desired, water or carbon dioxide may be introduced into the reactor with the feed to assist or promote the formation of the unsaturated nitrile product. The optimum amounts of these substances vary somewhat with the conditions and catalysts employed. It will be found that it is best to use about 0.5 to 5.0 moles of these promoters per mole of monoolefin in the feed. Also, small amounts of tertiary alcohols or isoolefins may be added to the feed gas in order to control undesirable reactions.

The following specific examples are given to provide a better understanding of the invention.

The catalysts used in the examples were prepared by mulling the specified copper salt with silica hydrogel (in the amounts indicated) and about 500 ml. of water (per kg. of hydrogel) in a ball mill for about 16 hours, separating the balls from the resulting mixture and drying the gel mixture at about 80° C. for 16 to 90 hours. In some cases the catalyst was subsequently heated in a furnace at approximately 530° C. for 16 hours. Also, in some instances a small amount of phosphoric acid was added to the mixture prior to mulling.

All of the reactions were effected at substantially atmospheric pressure in a 30 ml. annular-shaped glass reactor filled with 12 to 16 mesh catalyst particles. The reactor was fed through the top and product was continuously withdrawn from the bottom of the fixed bed. The reaction temperature indicated in each case is that of the Woods metal bath surrounding the reactor.

EXAMPLE 1

A number of runs were made at various temperatures with 20 wt. percent cupric pyrophosphate catalyst on silica hydrogel. The catalyst was heated in a furnace at 538° C. for 16 hours, crushed and the particles having a 12 to 16 mesh were used in the above-described reactor. The feed consisted of 19 vol. percent propylene, 9.6 vol. percent ammonia and 71.4 vol. percent air. The space velocity employed was 600 v./v./hr. The results are shown in Table I.

Table I

| Bath, ° C. | Percent Acrylonitrile in effluent | Yield/pass of Acrylonitrile on— | | Selectivity of Acrylonitrile on— | |
|---|---|---|---|---|---|
| | | $NH_3$ | $C_3^=$ | $NH_3$ | $C_3^=$ |
| | | Percent | Percent | Percent | Percent |
| 410 | 2.01 | 17.0 | 8.6 | 50 | 48 |
| 415 | 2.08 | 17.3 | 8.8 | 42 | 46 |
| 420 | 2.39 | 19.4 | 9.8 | 44 | 50 |
| 430 | 2.7 | 21.4 | 10.9 | 42 | -- |
| 435 | 3.03 | 23.6 | 12.0 | 43 | 47 |
| 440 | 2.8 | a 21.7 | 11.0 | 33 | 43 | a =7% yield HCN.

The best yields were obtained at about 430 to 440° C. In another run at 437° C. in which a 10 wt. percent cupric pyrophosphate catalyst on silica hydrogel was used under essentially the same conditions (except there was 9 vol. percent ammonia in the feed) the yield per pass of acrylonitrile was 27.2% and the selectivity was 36%, both based on ammonia.

EXAMPLE 2

Several runs were made at temperatures between 390° and 420° C. with catalysts consisting of sundry phosphates of copper on silica hydrogel. The feed in each case consisted of 19.0 vol. percent propylene, 9.7 vol. percent ammonia and 71.3 vol. percent air. The reactions were effected at a space velocity of 600 v./v./hr. In all of these runs the copper salt was mulled with silica hydrogel, the resulting mixture oven-dried, heated in a furnace to 538° C. crushed and sized to 12–16 mesh. The results are given in Table II.

Table II

| Catalyst, Wt. Percent on Silica Hydrogel | Mole Percent Yield Acrylonitrile [1] | Bath, ° C. |
|---|---|---|
| 16% $CuHPO_4$ | 22 | 390 |
| 20% $Cu_3(PO_4)_2$ | 22 | 405 |
| 20% $Cu_3(PO_3)_6$ | 22 | 420 |
| 20% Copper tripolyphosphate | 24 | 415 |

[1] Based on ammonia.

Similar runs carried out with a copper oxide-silica hydrogel catalyst resulted in a substantially smaller yield of acrylonitrile (ca. 10 mole percent).

EXAMPLE 3

One run was carried out at 437° C. and a space velocity of 600 v./v./hr. with a feed consisting of 18.6 vol. percent propylene, 8.8 vol. percent ammonia and 72.6 vol. percent air. The yield of acrylonitrile was 27 mole percent. The catalyst was prepared in a similar manner to that described in Example 2. It consisted of 10 weight percent copper pyrophosphate based on the silica content of the silica hydrogel.

EXAMPLE 4

Several runs were made under the conditions used in Example 3 with a feed consisting of 9.6 vol. percent ammonia and 19 vol. percent propylene in air utilizing catalysts containing various amounts of copper pyrophosphate that were prepared in accordance with the process described in Example 2. The results are presented in Table III.

Table III

| Wt. Percent of $Cu_2P_2O_7$ | Bath, ° C. | Yield of Acrylonitrile on $NH_3$, Mole Percent |
|---|---|---|
| 2.5 | 435 | 20.4 |
| 5.0 | 435 | 21.8 |
| 20.0 | 435 | 23.6 |
| 40.0 | 425 | 20.0 |

In another run effected at a space velocity of 1300 v./v./hr. and 450° C., a feed consisting of 3.8 vol. percent ammonia and 9.0 vol. percent propylene in air, yielded 57 mole percent acrylonitrile, based on ammonia.

EXAMPLE 5

A copper orthophosphate catalyst was prepared by mulling reagent cupric phospate with silica hydrogel and water (500 ml./1 kg. of hydrogel) for 16 hours. A similar catalyst was prepared to which 9.5 wt. percent of 86% phosphoric acid was added before mulling. Both catalysts were heated to 538° C., crushed and sized to 12–16 mesh. At a space velocity of 600 v./v./hr., the phosphoric acid treated catalyst resulted in a 21 mole percent yield of acrylonitrile on ammonia at 448° C., the untreated catalyst resulted in a 13 mole percent yield at 397° C. In both instances the feed gas consisted of 8.6 vol. percent ammonia and 19 vol. percent propylene in air.

Resort may be had to various modifications and variations of the present invention without departing from the spirit or scope of the appended claims.

What is claimed is:

1. In a process for making an aliphatic nitrile by reacting an olefin selected from the group consisting of propylene, isobutylene and 2-butene with a mixture of ammonia and oxygen, the improvement comprising carrying out said reaction in the presence of a catalyst selected from the group consisting of cupric orthophosphate, cupric metaphosphate, cupric tripolyphosphate, cupric acid phosphate and cupric pyrophosphate at about 250 to 550° C. under approximately atmospheric pressure for up to 15 seconds, the respective molar ratio of oxygen and ammonia to monoolefin being 0.3 to 5 and 0.1 to 5.

2. The process for making acrylonitrile which comprises contacting in the vapor phase a mixture of propylene, ammonia and oxygen in the presence of a catalyst selected from the group consisting of cupric orthophosphate, cupric metaphosphate, cupric tripolyphosphate, cupric acid phosphate and cupric pyrophosphate at a temperature of about 350 to 450° C. and approximately atmospheric pressure for up to 10 seconds and recovering said acrylonitrile.

3. The process of claim 2 in which the catalyst is treated with phosphoric acid.

4. The process of claim 2 in which the oxygen is in the form of air.

5. The process for making acrylonitrile which comprises contacting in vapor phase a mixture of propylene, ammonia and oxygen in the presence of a catalyst consisting of cupric pyrophosphate supported on silica at a temperature of about 350 to 450° C. and approximately atmospheric pressure for up to 10 seconds and recovering said acrylonitrile.

6. The process for making acrylonitrile which comprises contacting in vapor phase a mixture of propylene, ammonia and oxygen in the presence of a catalyst consisting of cupric tripolyphosphate at a temperature of about 350 to 450° C. and approximately atmospheric pressure for up to 10 seconds and recovering said acrylonitrile.

References Cited in the file of this patent

UNITED STATES PATENTS

| | | |
|---|---|---|
| 2,481,826 | Cosby | Sept. 13, 1949 |
| 2,904,580 | Idol | Sept. 15, 1959 |
| 3,005,517 | Idol et al. | Oct. 24, 1961 |
| 3,009,943 | Hadley et al. | Nov. 21, 1961 |

OTHER REFERENCES

Bergmann: "Acetylene Chemistry" (1948), page 80.